A. N. MENDELSON.
TRAFFIC SIGNAL.
APPLICATION FILED SEPT. 21, 1920.
1,372,530.
Patented Mar. 22, 1921.
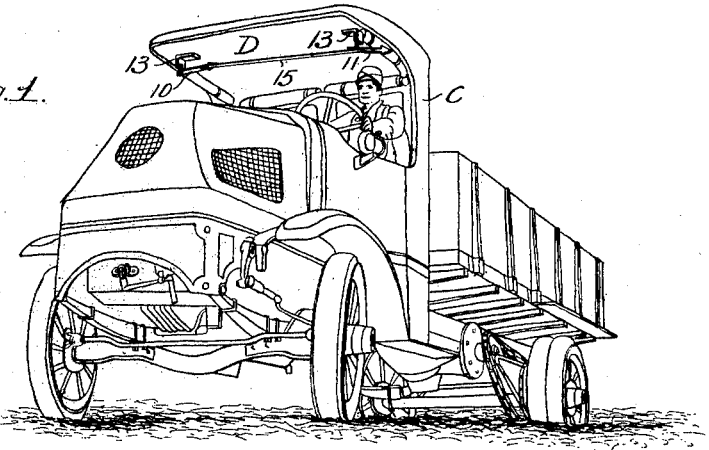
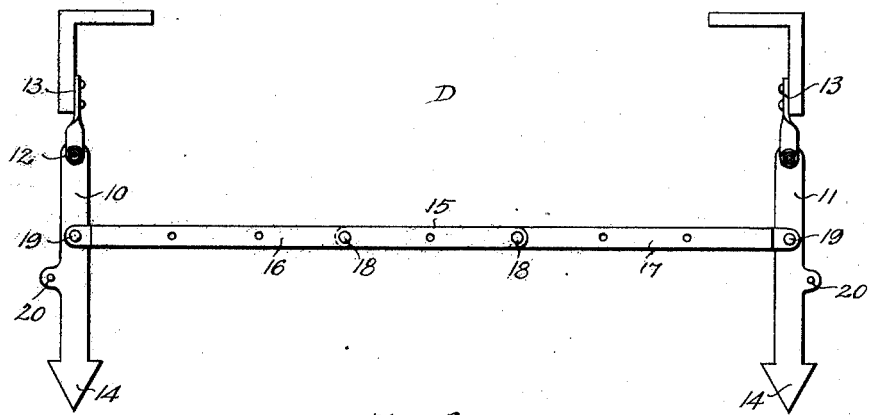
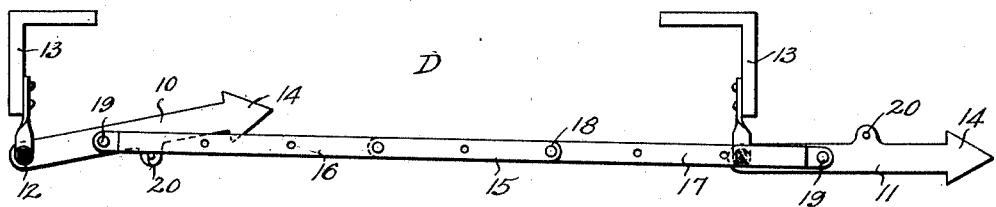
WITNESSES
INVENTOR
ABRAM N. MENDELSON
BY
ATTORNEYS

UNITED STATES PATENT OFFICE.

ABRAM N. MENDELSON, OF NEW YORK, N. Y.

TRAFFIC-SIGNAL.

1,372,530.

Specification of Letters Patent.

Patented Mar. 22, 1921.

Application filed September 21, 1920. Serial No. 411,792.

*To all whom it may concern:*

Be it known that I, ABRAM N. MENDELSON, a citizen of the United States, and a resident of the city of New York, borough of Manhattan, in the county of New York and State of New York, have invented a new and Improved Traffic-Signal, of which the following is a full, clear, and exact description.

This invention relates to signaling devices and has particular reference to a traffic signal or directional indicator for automobiles or other road vehicles, the same being particularly designed for use on large motor trucks.

Primarily the invention contemplates and aims to produce a traffic signal which is simple in construction and operation, inexpensive to produce, and which may be readily installed at a minimum expense.

A further object of the invention is to provide a device of this character which may be manufactured in a standard size and which is readily adjustable whereby to adapt the same to vehicles of various widths.

A further object of the invention is to provide a device of the character described which is readily operable by the driver of the vehicle without materially distracting his attention from his duties in the control of his car.

With these and other objects in view, the invention resides in the novel combination and arrangement of parts set forth in the following specification, pointed out in the appended claims and illustrated in the accompanying drawings in which;

Figure 1 is a perspective view of a vehicle equipped with the invention.

Fig. 2 is an enlarged detail front elevation of the signal and its associated parts removed from the vehicle and illustrating the signal arms in a neutral position.

Fig. 3 is a similar view illustrating the signal arms thrown to and supported in signaling position.

Referring to the drawings by characters of reference C designates a cab of a motor truck upon which the signaling device designated generally by the character D is mounted. The signaling device includes a pair of signaling arms 10 and 11 each of which is pivoted as at 12 to its respective supporting bracket 13, which brackets are secured to the under side of the roof of the cab. The signaling arms 10 and 11 may be of any desired configuration but as here illustrated the same are formed at their free extremities with an arrow head 14 and are connected medially by a longitudinally adjustable connecting bar 15 which comprises the sections 16 and 17 which are adapted to be secured together at their inner ends by the bolts 18. The outer free end of each arm 16 and 17 is slightly offset and pivoted as at 19 to the respective signaling arms 10 and 11. Each of the signal arms are provided with projecting lugs 20 positioned in such a manner as to engage the connecting bar 15 when the arm is swung upwardly in one direction.

In operation of the device, when the arm 11 is swung outwardly to project from the side of the cab C the other arm will be swung inwardly until the stop lug 20 engages and co-acts with the connecting bar 15. When the inner arm 10 has reached the limit of its upward movement, its pivot 19 will have advanced a sufficient distance past a line drawn from its pivot point 12 and pivotal point of connection 19 of the bar 15 with the remaining arm to retain the arms against casual displacement. It will thus be seen that it is only necessary for the driver to lift the arm, in order to signal following or approaching traffic of his intention to turn either to the right or left. Normally the arms 14 depend vertically so that they are in a non-signaling position and are within convenient reach of the driver when desired. The adjustability of the connecting bar 15 permits of the adaptation of the device to vehicles of various widths by securing the sections 16 and 17 thereof in relatively adjusted relation.

From the foregoing it is apparent that a signaling device which is extremely inexpensive and yet highly efficient is provided to fulfil a long needed want for safeguarding property and life.

While there has been shown and described a preferred adaptation of the invention, it is understood that the same is merely illustrative and that embodiments other than those actually illustrated herein, may be resorted to, to the full extent indicated by the general meaning of the terms in which the claims are expressed and by variations in the phraseology of the same.

Having thus described my invention, I claim as new and desire to secure by Letters Patent:

1. In a traffic signal, a pair of signal arms pivoted respectively at opposite sides of a vehicle, a connection therebetween for effecting simultaneous movements thereof and means on the respective arms adapted to independently co-act with said connection for maintaining either arm in signaling position, with the other arm in a nonsignaling position.

2. In a traffic signal for vehicles, signaling arms respectively pivoted to the opposite sides of the same and adapted to normally hang in concealed position, means for coupling said arms for simultaneous movements and means on the respective arms adapted to co-act with the coupling means whereby the means on either arm will function to maintain the other in an indicating position upon swinging of the arms to a position to render the means active.

3. In a traffic signal, the combination with a pair of pivotally connected arms swingingly supported at opposite sides of a vehicle, of means on the respective arms adapted to co-act with the arm connection whereby said means will function to support the other arm in signaling position upon swinging of either of said arms to a signaling position.

4. A traffic signal comprising a pair of swingingly supported arms arranged at opposite sides of a vehicle, means for connecting the same whereby to effect simultaneous movements of said arms and means on each arm adapted to respectively engage and co-act with the connecting means whereby when either one of said arms is swung to signaling position, it will be supported by the engagement of the means on the other arm with said connecting means.

5. In a device of the character described, a pair of brackets, a signal arm pivoted to each bracket and adapted to normally depend therefrom by gravity to a concealed position, a connecting bar pivotally secured at its opposite ends to the arms for coupling the same to effect simultaneous movements thereof, a stop lug on each arm, the stop lug of either arm adapted to co-act and engage the connecting bar when the other arm is swung outwardly to a signaling position whereby due to a past center arrangement, the non-signaling arm will retain the signaling arm in a signaling position.

6. In a traffic signal, a pair of signal arms pivoted respectively to the vehicle at opposite sides thereof to normally depend by gravity to a concealed position and adapted to be swung outwardly to signaling position, a connecting bar pivotally secured at its opposite ends to each arm for coupling the same for simultaneous movement whereby the open swinging of one of the arms outwardly to signaling position the other will swing inwardly, an offset stop lug on each arm adapted to engage and co-act with the connecting bar when the pivotal connection between the bar and the non-signaling arm passes above the plane of the pivots of the arms whereby to retain the other arm in signaling position.

ABRAM N. MENDELSON.